(12) United States Patent
Hiranuma et al.

(10) Patent No.: US 7,104,049 B2
(45) Date of Patent: Sep. 12, 2006

(54) EXHAUST GAS PURIFYING SYSTEM AND REGENERATION END DETERMINING METHOD

(76) Inventors: Satoshi Hiranuma, c/o Mitsubishi Fuso Truck and Bus Corporation, 16-4, Konan 2-Chome, Minato-ku, Tokyo, 108-8285 (JP); Yoshinaka Takeda, c/o Mitsubishi Fuso Truck and Bus Corporation, 16-4, Konan 2-Chome, Minato-ku, Tokyo, 108-8285 (JP); Toru Kawatani, c/o Mitsubishi Fuso Truck and Bus Corporation, 16-4, Konan 2-Chome, Minato-ku, Tokyo, 108-8285 (JP); Reiko Doumeki, c/o Mitsubishi Fuso Truck and Bus Corporation, 16-4, Konan 2-Chome, Minato-ku, Tokyo, 108-8285 (JP)

( * ) Notice: Subject to any disclaimer, the term of this patent is extended or adjusted under 35 U.S.C. 154(b) by 176 days.

(21) Appl. No.: 10/808,209

(22) Filed: Mar. 24, 2004

(65) Prior Publication Data

US 2004/0244362 A1 Dec. 9, 2004

(30) Foreign Application Priority Data

Mar. 25, 2003 (JP) ............................. 2003-083653

(51) Int. Cl.
*F01N 3/00* (2006.01)
(52) U.S. Cl. ............................ 60/295; 60/274; 60/276; 60/297; 60/311
(58) Field of Classification Search .................. 60/274, 60/276, 285, 295, 297, 311
See application file for complete search history.

(56) References Cited

U.S. PATENT DOCUMENTS

| | | | |
|---|---|---|---|
| 4,835,964 A * | 6/1989 | Kume et al. ................... | 60/285 |
| 6,598,387 B1 | 7/2003 | Carberry et al. | |
| 6,622,480 B1 | 9/2003 | Tashiro et al. | |
| 6,655,132 B1 * | 12/2003 | Bouchez et al. .............. | 60/295 |
| 6,666,020 B1 | 12/2003 | Tonetti et al. | |
| 6,698,192 B1 | 3/2004 | Ootake | |
| 6,722,120 B1 * | 4/2004 | Plote ............................ | 60/276 |
| 6,758,037 B1 | 7/2004 | Terada et al. | |
| 6,813,882 B1 * | 11/2004 | Hepburn et al. .............. | 60/286 |

FOREIGN PATENT DOCUMENTS

| | | | |
|---|---|---|---|
| JP | 5-41809 B2 | | 6/1993 |
| JP | 07-034858 | * | 2/1995 |
| JP | 7-259533 A | | 10/1995 |

\* cited by examiner

*Primary Examiner*—Thomas Denion
*Assistant Examiner*—Diem Tran
(74) *Attorney, Agent, or Firm*—Rossi, Kimms & McDowell, LLP

(57) ABSTRACT

An exhaust gas purification system includes an oxygen mass flow rate detecting unit for detecting or calculating a mass flow rate of oxygen fed to a filter and a regeneration end determining unit for determining a regeneration end of the filter in accordance with information provided from the oxygen mass flow rate detecting-unit and upon arrival of an integrated value of the oxygen mass flow rate at a predetermined value during regeneration of the filter.

13 Claims, 6 Drawing Sheets

CATALYST OUTLET TEMPERATURE < 250°C

CATALYST OUTLET TEMPERATURE ≧ 250°C

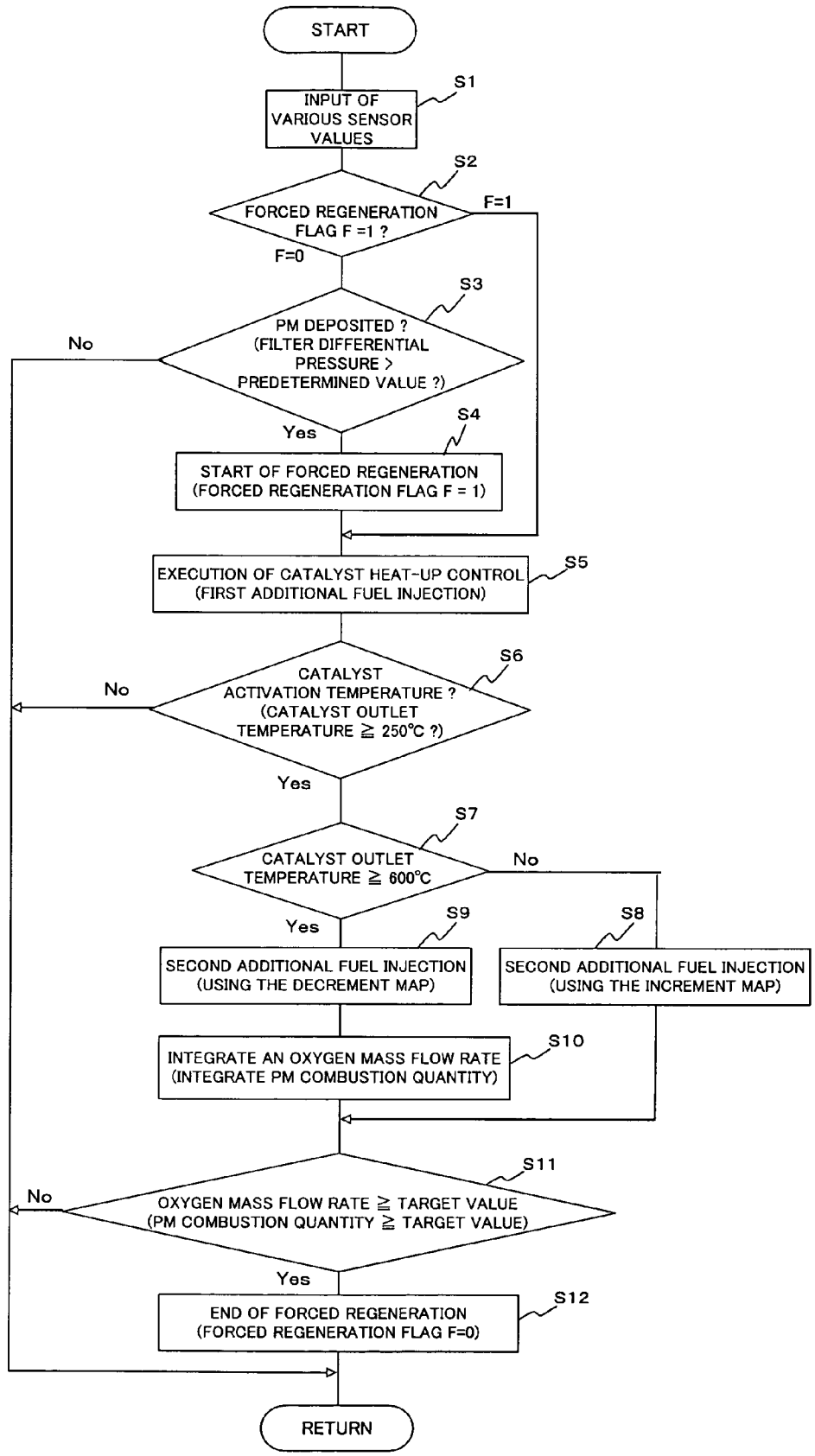

START OF FORCED REGENERATION

START OF INTEGRATION

EXHAUST GAS PURIFYING SYSTEM AND REGENERATION END DETERMINING METHOD

BACKGROUND OF THE INVENTION (1) Field of the Invention

The present invention relates to an exhaust gas purifying system and a regeneration end determining method both suitable for use particularly in a diesel engine.

(2) Description of Related Art

Heretofore, there has been known a technique wherein an oxidation catalyst and a particulate filter (hereinafter referred to simply as "filter") are disposed in an exhaust passage of a diesel engine, allowing a particulate matter (PM) contained in exhaust gas to be deposited on the filter, and the PM thus deposited on the filter is burnt to regenerate the filter continuously.

In the exhaust gas purifying system constructed as above, NO contained in exhaust gas is oxidized in the oxidation catalyst to produce $NO_2$, then the $NO_2$ and the PM on the filter are reacted with each other, allowing the PM to burn (be oxidized) to regenerate the filter continuously. $NO_2$ exhibits a high function as an oxidizing agent in comparison with NO and permits the PM to be oxidized with a relatively low activation energy (that is, permits the PM to burn at a relatively low temperature).

In a certain operating condition of an engine there is a case where the exhaust gas temperature does not rise to an activation temperature of the oxidation catalyst, so that NO is not oxidized and hence a continuous regeneration of the filter is not effected. In such a case it is necessary to perform a forced regeneration different from the continuous regeneration.

As a method for the forced regeneration there is known a method wherein a heat source such as an electric heater is attached to the filter and an electric current is supplied to the heater, allowing PM to burn, or a method wherein fuel (HC) is fed to the oxidation catalyst and is allowed to undergo an oxidation reaction in the oxidation catalyst, the temperature of the filter is increased by the reaction heat to cause burning of the PM.

In the forced regeneration, however, the combustion temperature is higher than in the continuous regeneration and therefore it is necessary to positively control the state of burning of PM. More specifically, not only it is necessary to control the filter temperature with a high accuracy, but also it is necessary to accurately determine a filter regeneration start timing and a filter regeneration end timing.

As to an end timing of forced regeneration, it is generally determined on the basis of an elapsed time from the start of forced regeneration. Usually, an end of forced regeneration is determined upon lapse of a certain time from the start of forced regeneration (i.e., from the time-point of arrival of the filter temperature at a predetermined temperature as a PM burning temperature) (prior art 1).

Also in Japanese Examined Patent Application Publication No. H05(1993)-41809 (Patent Literature 1) there is disclosed a technique for determining an end timing of forced regeneration. According to the technique disclosed in Patent Literature 1, a correction coefficient k is set in accordance with a filter inlet temperature $T_{in}$ and there is calculated the product (k·Δt) of the coefficient k and the time Δt during which the filter holds the inlet temperature $T_{in}$, further, an integrated value of the product, $\Sigma(k \cdot \Delta t)$, is determined and a forced regeneration is stopped when the integrated value $\Sigma(k \cdot \Delta t)$ reaches a predetermined value or a larger value (prior art 2).

However, the prior art 1 involves a problem that it is impossible to determine an end of forced regeneration correctly. More particularly, the flow rate of exhaust gas varies depending on the state of vehicular running and an operating condition of an engine (that is, the flow rate of exhaust gas is not constant), so in a forced regeneration, the amount of PM which burns in unit time differs depending on a vehicular running condition and an operating condition of an engine. Thus, in a method which controls the determination of a forced regeneration end on the basis of the regeneration time, it is impossible to make such a determination of a forced regeneration end as is suitable for a vehicular running condition and an operating condition of an engine. If the forced regeneration time is too long, the fuel economy is deteriorated, while if it is too short, the regeneration of filter will not be effected to a satisfactory extent.

In the technique (prior art 2) disclosed in Patent Literature 1, the time is multiplied by the coefficient k which is proportional to the filter inlet temperature $T_{in}$. However, it is not that the combustion efficiency of PM depends solely on temperature. Thus, even with this technique, it is impossible to make a correct determination of a regeneration end. Although in this technique the time is multiplied by the correction coefficient k, an end timing is determined basically depending on the regeneration time Δt and thus a regeneration end cannot be determined accurately.

SUMMARY OF THE INVENTION

The present invention has been accomplished in view of the above-mentioned problems and it is an object of the invention to provide an exhaust gas purifying system of a simple construction and capable of determining a filter regeneration end timing with a high accuracy.

For achieving the above-mentioned object, an exhaust gas purifying system according to the present invention comprises an oxidation catalyst disposed in an exhaust passage of an engine, a filter disposed in the exhaust passage at a position downstream of the oxidation catalyst to collect a particulate matter contained in exhaust gas, a regeneration start determining means for determining a regeneration start of the filter, a regenerator means for regenerating the filter, an oxygen mass flow rate detecting means for detecting or calculating a mass flow rate of oxygen fed to the filter, and a regeneration end determining means for determining a regeneration end of the filter in accordance with information provided from the oxygen mass flow rate detecting means upon arrival of an integrated value of the oxygen mass flow rate at a predetermined value during regeneration of the filter by the regenerator means.

The exhaust gas purifying system may further comprise a temperature detecting means for detecting the temperature of the filter, and the regeneration end determining means may be constructed so as to determine a regeneration end of the filter in accordance with information provided from the temperature detecting means and the oxygen mass flow rate detecting means upon arrival at a predetermined value of an integrated value of the oxygen mass flow rate from the time when the temperature of the filter has reached a predetermined temperature.

The regeneration end determining means may be constructed so as to determine a regeneration end of the filter upon establishment of the following equation:

$$\Sigma \Delta PM = C \cdot \Sigma \text{ (oxygen mass flow rate)}$$

where, $C = A \cdot PM \cdot e^{(-E/RT)}$ $\Sigma \Delta PM$: target combustion quantity of particulate matter
$\Sigma$ (oxygen mass flow rate): integrated value of a mass flow rate of oxygen fed to the filter
A: constant obtained by experiment (frequency factor)
PM: amount of particulate matter deposited on the filter at the beginning of regeneration
E: activation energy constant
R: gas constant
T: filter temperature The exhaust gas purifying system may further comprise an air flow sensor for detecting a flow rate of intake air, and the oxygen mass flow rate detecting means may be constructed so as to calculate the oxygen mass flow rate $O_{2w}$ in accordance with the following equation including the mass flow rate of intake air $Q_{aw}$ obtained from the air flow sensor:

$$O_{2w} = (Q_{aw} - q \cdot a) \cdot b$$

where, q: fuel injection quantity
a: equivalence ratio
b: oxygen mass ratio

The exhaust gas purifying system may further comprise an $O_2$ sensor disposed between the oxidation catalyst and the filter to detect an oxygen concentration and a sensor for detecting the flow rate of fluid entering the filter, and the oxygen mass flow rate detecting means may be constructed so as to calculate the oxygen mass flow rate $O_{2w}$ on the basis of detection results provided from the two sensors.

The regeneration end determining means may have a combustion quantity estimating means for calculating or estimating a combustion quantity of the particulate matter collected by the filter, the combustion quantity estimating means may be constructed so as to calculate or estimate a combustion quantity of the particulate matter by multiplying the integrated value of the oxygen mass flow rate obtained from the oxygen mass flow rate detecting means by a predetermined coefficient, and the end of regeneration of the filter may be determined upon arrival at a predetermined target value of the combustion quantity of the particulate matter calculated or estimated by the combustion quantity estimating means.

Preferably, the regeneration start determining means has a deposition quantity estimating means for calculating or estimating a deposition quantity of the particulate matter deposited on the filter, and the predetermined target value is a deposition quantity of the particulate matter at the beginning of the regeneration which is estimated by the deposition quantity estimating means.

Preferably, the temperature detecting means is a temperature sensor disposed downstream of the catalyst, and an outlet temperature of the catalyst is used as the temperature of the filter.

The temperature detecting means may comprise temperature sensors disposed upstream and downstream respectively of the filter to detect an inlet temperature Tf and an outlet temperature Tr of the filter, and may calculate a filter temperature on the basis of the inlet temperature Tf and the outlet temperature Tr detected by the temperature sensors and in accordance with the following equation:

Filter temperature $T_{fil} = Tf \cdot a + Tr \cdot (1-a)$ where, a: a value for weighting the inlet temperature Tf and the outlet temperature Tr, satisfying the relation of $0 \leq a \leq 1$.

Preferably, the regeneration end determining means determines the end of regeneration only during forced regeneration of the filter.

Preferably, the engine is a diesel engine.

A regeneration end determining method according to the present invention is for an exhaust gas purifying system comprising an oxidation catalyst disposed in an exhaust passage of an engine and a filter disposed in the exhaust passage at a position downstream of the oxidation catalyst to collect a particulate matter contained in exhaust gas, and comprises the steps of starting a forced regeneration of the filter, determining whether the temperature of the filter has reached a predetermined temperature or not during execution of said forced regeneration, determining whether an integrated value of an oxygen mass flow rate from the time-point of arrival of the filter temperature at the predetermined temperature during execution of the forced regeneration has reached a predetermined value or not, and terminating the forced regeneration upon arrival of the integrated value of the oxygen mass flow rate at the predetermined value.

Further, a regeneration end determining method according to the present invention is for an exhaust gas purifying system comprising an oxidation catalyst disposed in an exhaust passage of an engine and a filter disposed in the exhaust passage at a position downstream of the oxidation catalyst to collect a particulate matter contained in exhaust gas, and comprises the steps of determining whether a forced regeneration of the filter is being executed or not, determining whether the temperature of the filter has reached a predetermined temperature or not during execution of the forced regeneration, determining whether an integrated value of an oxygen mass flow rate from the time-point of arrival of the filter temperature at the predetermined temperature during execution of the forced regeneration has reached a predetermined value or not, and terminating the forced regeneration upon arrival of the integrated value of the oxygen mass flow rate at the predetermined value.

Thus, according to the present invention, during regeneration (especially forced regeneration) of the filter, it is possible to grasp a PM combustion quantity accurately despite an operating condition of the engine and hence possible to determine a regeneration end precisely. Consequently, a worsening of fuel economy due to a too long regeneration time or conversely a defective regeneration due to a too short regeneration time can be avoided. According to the present invention, moreover, the determination of a regeneration end can be done highly accurately with a simple construction without using any complicated logic or any special component. Neither an increase of cost nor an increase of weight results.

BRIEF DESCRIPTION OF THE DRAWINGS

FIG. 4 is a flow chart explaining the operation of the exhaust gas purifying system;

DESCRIPTION OF THE PREFERRED EMBODIMENTS

Figure 1:
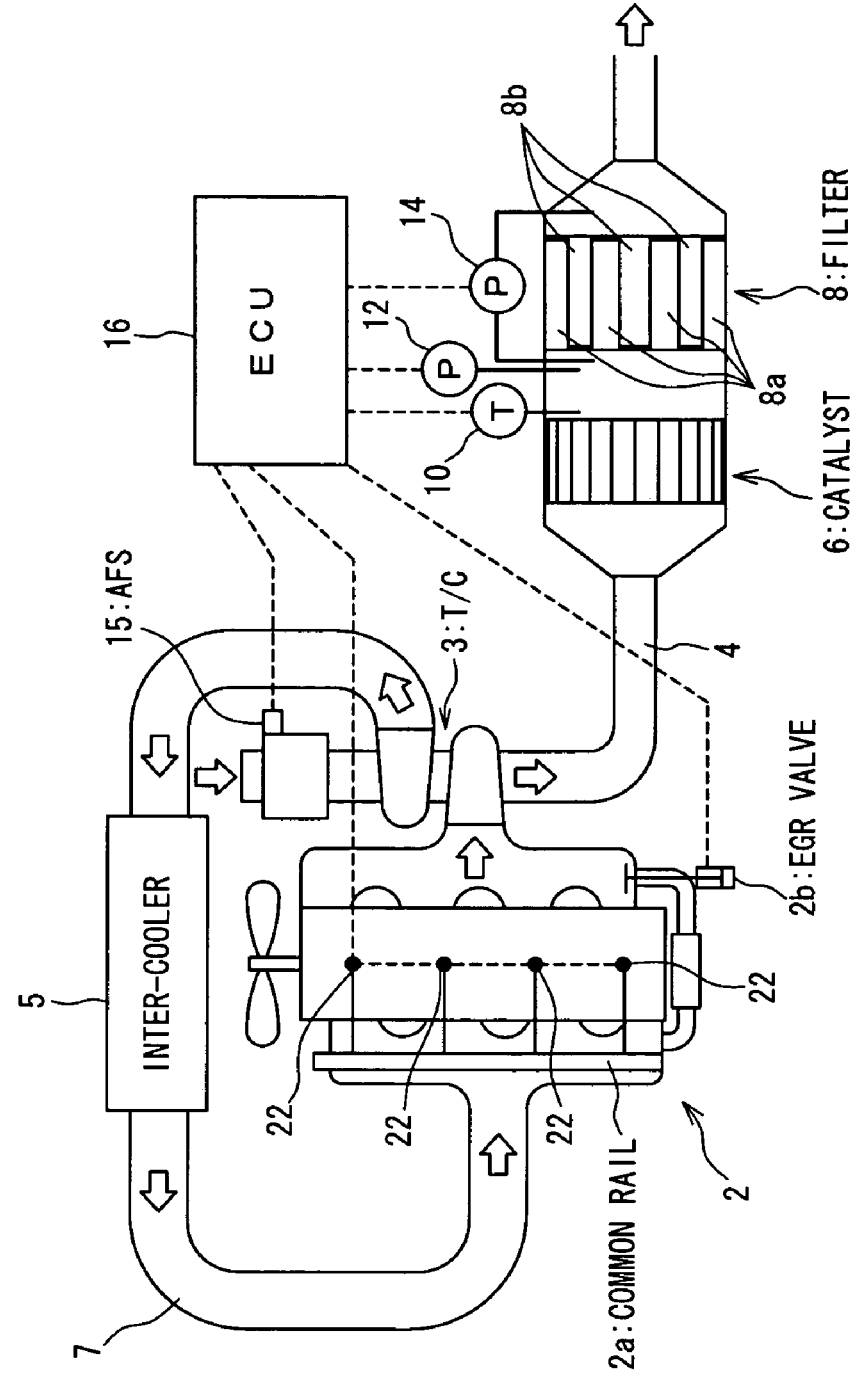
FIG. 1 is a schematic diagram showing an entire construction of an exhaust gas purifying system according to an embodiment of the present invention.

An exhaust gas purifying system according to an embodiment of the present invention will be described with reference to the accompanying drawings, in which FIG. 1 is a schematic diagram showing an entire construction of the exhaust gas purifying system. In this embodiment, an engine 2 is a diesel engine using gas oil (HC) as fuel. The engine 2 is provided with a common rail type fuel injection system wherein fuel is once stored in a high pressure storage chamber (common rail) 2a which is common to plural cylinders and is then injected.

In an exhaust passage 4 of the engine 2, an oxidation catalyst (hereinafter referred to simply as "catalyst") 6 and a diesel particulate filter (simply "filter" hereinafter) 8 are disposed in this order from an upstream side of an exhaust gas flow. Further, a turbocharger 3 is disposed in the exhaust passage 4 and an inter-cooler 5 is disposed in an intake passage 7.

Though not shown in detail, the whole of the filter 8 is formed of a porous material, and the filter 8 comprises first passages 8a which are open upstream and closed downstream and second passages 8b which are closed upstream and open downstream, the first and second passages 8a, 8b being arranged in an alternately adjacent manner. According to this arrangement, exhaust gas fed into the filter 8 flows from the first passages 8a to the second passages 8b through porous wall portions. At this time, PM (a particulate matter consisting principally of carbon C) contained in the exhaust gas is collected in the wall portions.

The oxidation catalyst 6 exhibits the same function as that described above in connection with the prior art. During normal running of the vehicle concerned, NO contained in exhaust gas is oxidized in the oxidation catalyst 6 into $NO_2$, which is then fed as an oxidizing agent to the filter 8. In the filter 8, the $NO_2$ reacts with PM, so that the PM burns and the filter 8 is regenerated continuously.

Between the catalyst 6 and the filter 8 there are disposed a temperature sensor (temperature detecting means) 10 for detecting an outlet temperature of the catalyst 6 and an inlet temperature of the filter 8 and a pressure sensor (absolute pressure detecting means) 12 for detecting an absolute pressure. In the filter 8 there is provided a differential pressure sensor (differential pressure detecting means) 14 for detecting a differential pressure between an upstream-side pressure and a downstream-side pressure in the filter 8. Further, upstream of the intake passage 7 there is disposed an air flow sensor (AFS) 15 for detecting the flow rate of intake air.

Although in this embodiment the pressure sensor 12 and the differential pressure sensor 14 are provided each independently, absolute pressure detecting sensors may be respectively disposed upstream and downstream of the filter 8, allowing them to also fulfill the functions of the pressure sensor 12 and the differential pressure sensor 14. That is, the portion in question may be constructed such that a detected value obtained in the upstream sensor is detected as an absolute pressure and a differential pressure is calculated from detected values obtained in the upstream and downstream sensors.

The sensors 10, 12, 14, and 15 are connected to an ECU 16 as a control means. The ECU 16 comprises an input/output device, memories (ROM, RAM, non-volatile memory), an arithmetic unit (CPU), and a timer counter. A synthetic control for the engine 1 is executed by the ECU 16.

Figure 2:
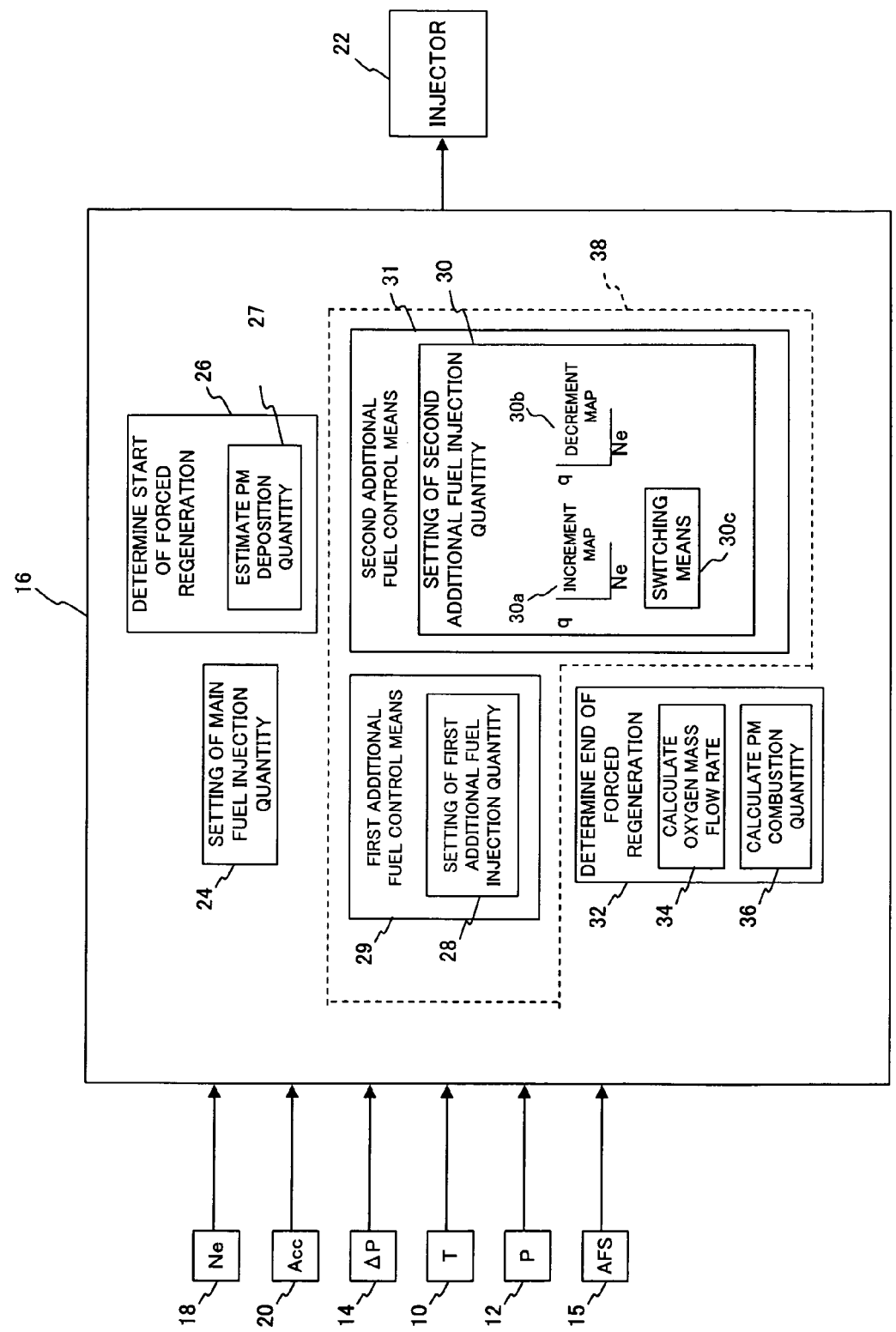
FIG. 2 is a schematic diagram showing the construction of a principal portion of the exhaust gas purifying system.

As shown in FIG. 2, on an input side of the ECU 16 there are provided an engine speed sensor (engine speed detecting means) 18 for detecting an engine speed Ne of the engine 2 and an accelerator position sensor 20 for detecting an accelerator position, in addition to the sensors 10, 12, and 14.

To an output side of the ECU 16 there are connected various output devices, including an injector (fuel injection valve) 22 and an EGR valve 2b shown in FIG. 1, and control signals provided from the ECU 16 are inputted to those output devices.

Within the ECU 16, as shown in FIG. 2, there are provided a main fuel injection quantity setting means 24, a forced regeneration start determining means 26, a first additional fuel control means 29, a second additional fuel control means 31, and a forced regeneration end determining means 32. In this embodiment, a filter regenerating means 38 is constituted by the first and second additional fuel control means 29, 31.

In the first additional fuel control means 29 there is provided a first additional fuel quantity setting means 28, while in the second additional fuel control means 31 there is provided a second additional fuel injection quantity setting means 30.

The main fuel injection quantity setting means 24 is for setting a fuel injection quantity (main injection quantity), q main, in normal running of the vehicle. Within the main fuel injection quantity setting means 24 there is stored a three-dimensional map using the engine speed Ne and the accelerator position Acc as parameters. In the main fuel injection quantity setting means 24, a main injection quantity, q main, is set in accordance with information provided from the engine speed sensor 18 and the accelerator position sensor 20. In the common rail type fuel injection system, the fuel injection quantity is controlled in accordance with the operation time of the injector 22, while in the main fuel injection quantity setting means 24 the operation time of the injector 22 is set so as to give the set fuel injection quantity.

The forced regeneration start determining means 26 determines whether a forced regeneration of the filter 8 is to be started or not. In the forced regeneration start determining means 26 there is provided a PM deposition quantity estimating means 27 for estimating (or calculating) a PM deposition quantity in accordance with information provided from the pressure sensor 12 and the differential pressure sensor 14. When the PM deposition quantity estimated by the PM deposition quantity estimating means 27 has reached a predetermined value or a larger value, the forced regeneration start determining means 26 determines that the filter 8 is clogged without being regenerated continuously, and determines that a forced regeneration of the filter 8 is to be started.

More specifically, in an operating condition (mainly a low speed and low load operation) wherein the exhaust gas temperature in the engine 2 is low, the exhaust gas temperature does not rise up to an activation temperature of the oxidation catalyst 6 and hence NO is not oxidized, therefore a continuous regeneration of the filter 8 may not be executed. In this case, PM is deposited too much on the filter 8, resulting in the filter being clogged. In view of this point, the forced regeneration start determining means 26 determines the start of forced regeneration of the filter 8 in accordance with pressure information on the filter. As to the PM deposition quantity estimating method, a detailed description thereof will here be omitted because various methods are already known.

According to the forced regeneration method used in this embodiment, first exhaust gas of a high temperature is fed directly to the catalyst 6, causing the catalyst temperature to rise up to its activation temperature (e.g., 250° C.), thereafter fuel is fed to the catalyst 6, allowing the fuel to undergo an oxidation reaction, and the filter temperature is raised by the reaction heat to burn the PM.

Figure 3A:
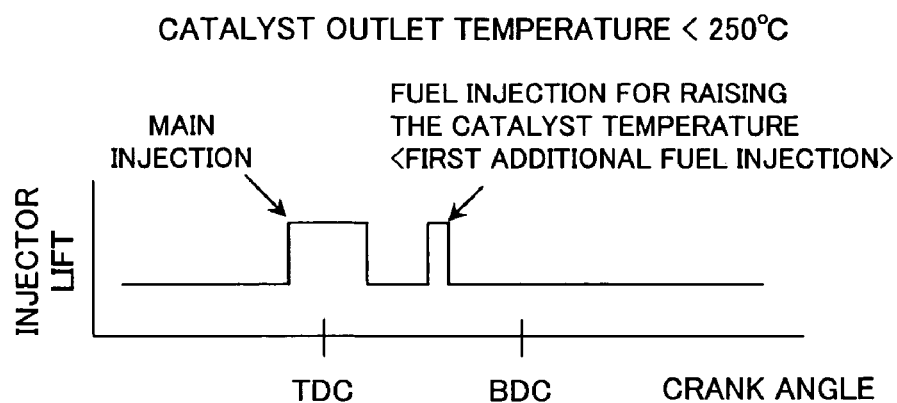
FIGS. 3A and 3B illustrate additional fuel injection timings in the exhaust gas purifying system.

When a forced regeneration is started by the forced regeneration start determining means 26, as shown in FIG. 3A, first in an expansion stroke an additional fuel (first additional fuel) is injected and the heat resulting from combustion of this additional fuel is used to raise the temperature of the catalyst 6.

The first additional fuel injection quantity setting means 28 sets a first additional fuel injection quantity q1 in accordance with an operating condition of the engine 2 and a catalyst outlet temperature detected by the temperature sensor 10. During the catalyst heat-up control, there also are performed retarding of main fuel injection timing and intake throttling in addition to the first additional fuel injection.

As shown in FIG. 3A, the first additional fuel injection timing is in a relatively early stage rather than a final stage of the expansion stroke, and by injecting the first additional fuel at such a timing the additional fuel and the high-temperature combustion gas in the cylinder are mixed together, the additional gas burns in an exhaust port and in the exhaust passage, and a high-temperature exhaust gas is fed to the catalyst 6 to raise the catalyst temperature.

Figure 3B:
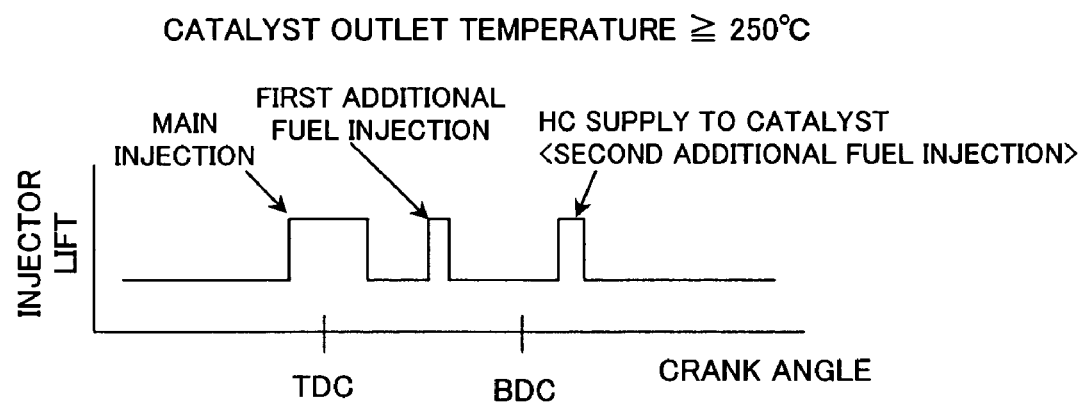

When it is determined in accordance with information provided from the temperature sensor 10 that the catalyst outlet temperature (the temperature of the catalyst 6) has increased to the activation temperature, a still additional fuel (second additional fuel) is injected after the injection of the first additional fuel, as shown in FIG. 3B. This second additional fuel is injected for example in an exhaust stroke. By such a timing of fuel injection, the fuel reaches the catalyst 6 without burning in the cylinder or in the exhaust passage and there is performed burning of the fuel in the catalyst 6 whose temperature has reached the activation temperature. As a result, the filter 8 positioned downstream of the catalyst 6 is heated and its temperature is raised up to a temperature (600° C.) at which the PM can be oxidized, whereby burning of the PM (regeneration of the filter) is executed.

The second additional fuel injection quantity setting means 30 sets such a second additional fuel injection quantity q2 in accordance with the engine speed Ne, engine load (here the main injection quantity, q main) and the catalyst outlet temperature.

A description will now be given of a method for setting the second additional fuel injection quantity q2. As shown in FIG. 2, in the second additional fuel injection quantity setting means 30 there are provided two maps 30a and 30b of different characteristics and a switching means 30c which makes switching to select one of those two maps. In each of the maps 30a and 30b there is stored a second additional fuel injection quantity using the engine speed Ne and load (main injection quantity, q main) as parameters. In accordance with information provided from the temperature sensor 10 the switching means 30c selects one of the two maps 30a and 30b and sets the second additional fuel injection quantity q2 in accordance with the selected map.

Of the two maps 30a and 30b, one map 30a is constituted as an increment map (a first fuel injection quantity map) in which the second additional fuel injection quantity is set relatively large, while the other map 30b is constituted as a decrement map (a second fuel injection quantity map) in which the second additional fuel injection quantity is set relatively small.

If the catalyst outlet temperature (filter inlet temperature) detected by the temperature sensor 10 is lower than a predetermined target temperature (here 600° C.), the second additional fuel injection quantity determining means 30 selects the increment map 30a and sets the second additional fuel injection quantity q2, while if the catalyst outlet temperature is not lower than the above predetermined temperature, the second additional fuel injection quantity setting means 30 selects the decrement map 30b and sets the second additional fuel injection quantity q2.

By thus making a simple feedback control based on the catalyst outlet temperature, for example when the catalyst outlet temperature is as high as 600° C. or more, the HC (fuel) fed to the catalyst 6 is suppressed, whereby a further increase in temperature of the filter 8 can be suppressed. As a result, it is possible to suppress overcombustion of PM and surely prevent fusion of the filter 8. Further, when the catalyst outlet temperature is lower than 600° C., the filter temperature can be increased by increasing the amount of HC fed. In this way the filter temperature (especially the central temperature of the filter) can be held at a temperature near 600° C. at which the PM burns most efficiently.

A brief description will now be given of both increment map 30a and decrement map 30b which are provided in the second additional fuel injection quantity setting means 30. Heretofore, only one map has been provided in the second additional fuel injection quantity setting means 30, but with such a single map it has been difficult to stabilize the temperature of the filter 8. In this embodiment, a value obtained by adding for example only Δq to a conventional map value is stored in memory and is set as the increment map 30a, while a value obtained by subtracting for example only Δq from a conventional map value is set as the decrement map 30b, and these two maps 30a and 30b are switched from one to the other according to temperature conditions. Thus it can be said that the second additional fuel injection quantity setting means 30 not only sets the second additional fuel injection quantity q2 in accordance with the engine speed Ne and load but also changes the fuel injection quantity q2 in accordance with the catalyst outlet temperature.

Since the main injection quantity, q main, used as a load is set by the main fuel injection quantity setting means 24, it follows that the main fuel injection quantity setting means 24 also functions as a load detecting means. The position of the accelerator may be used as a load instead of the main injection quantity, q main. In this case, the accelerator position sensor 20 functions as a load detecting means. The construction of the second additional fuel injection quantity setting means 30 is not limited to the above construction. For example, there may be adopted a construction wherein a map for setting a basic fuel injection quantity and a correction means for correcting the basic fuel injection quantity, (neither shown), are provided in the second additional fuel injection quantity setting means 30, and a correction corresponding to the catalyst outlet temperature is applied to the fuel injection quantity obtained from the said map (for example, multiplying the fuel injection quantity by a correction coefficient), and the thus-corrected fuel injection quantity is set as a second additional fuel injection quantity.

A more detailed control may be conducted by providing three maps in the second additional fuel injection quantity setting means 30. More specifically, a second increment map (a third fuel injection quantity map) which sets the fuel injection quantity still larger than in the increment map 30a is provided in addition to the increment map 30a and the decrement map 30b, and for example the second increment map is used when the catalyst outlet temperature is lower than 400° C., the increment map 30a is used when the catalyst outlet temperature is not lower than 400° C. and lower than 600° C., and the decrement map 30b is used when the catalyst outlet temperature is 600° C. or higher.

A principal portion of the present invention will now be described. The forced regeneration end determining means 32 determines a forced regeneration end of the filter 8. In this embodiment, when an integrated value of a mass flow rate of oxygen ($O_2$ mass flow rate) fed to the filter 8 from the time-point of arrival of the filter temperature (here substituted by the catalyst outlet temperature) at a predetermined temperature (600° C.) has reached a predetermined value (target value), a forced regeneration end timing of the filter 8 is determined. This is because the combustion quantity of PM corresponds to the oxygen mass flow rate and the combustion quantity of PM can be estimated from the mass flow rate of oxygen fed to the filter 8.

In more particular terms, the present inventors have found out experimentally that the combustion quantity of PM can be expressed by the following equation (1):

$$\Delta PM = A \cdot O_2 \text{ concentration} \cdot PM \cdot e^{(-E/RT)}$$

(1)

In the above equation (1), $\Delta PM$ stands for the quantity of PM which burns in unit time, A stands for a constant (frequency factor) obtained by experiment, PM stands for a PM deposition quantity at the beginning of regeneration, E stands for an activation energy constant which depends on hardware configuration such as whether the catalyst 6 is present or not, R stands for a gas constant, and T stands for the temperature of the filter.

Thus, by determining an integrated value of $\Delta PM$ in accordance with the following equation (2), it is possible to calculate a total combustion quantity of PM from the start of regeneration of the filter 8:

$$\Sigma \Delta PM = A \cdot \Sigma(O_2 \text{ concentration}) \cdot PM \cdot e^{(-E/RT)}$$

(2)

By simply regarding the PM deposition quantity and the filter temperature T as constant values, the $A \cdot PM \cdot e^{(-E/RT)}$ in the above equations (1) and (2) can be substituted by constant C. Therefore, the combustion quantity of PM from the start of regeneration can be expressed by the following equation (3). The $O_2$ concentration is synonymous with the mass flow rate of oxygen and the mass flow rate of oxygen will be used below mainly as $O_2$ concentration.

$$\Sigma \Delta PM = C \cdot \Sigma (O_2 \text{ concentration}) = C \cdot Z \text{ (oxygen mass flow rate)}$$

(3)

That is, the combustion quantity of PM can be calculated as parameter and the total combustion quantity of PM from the start of regeneration is equal to a value obtained by multiplying an integrated value of a mass flow rate of oxygen fed to the filter 8 by a predetermined coefficient C. In this embodiment, therefore, when an integrated value of an oxygen mass flow rate from the time-point of arrival at the combustion start point (600° C.) of PM after the start of forced regeneration of the filter 8 has reached a predetermined value (target value), it is determined that the PM deposited on the filter 8 has burnt, and an end of the forced regeneration is determined.

A more concrete description will now be given about the forced regeneration end determining step. In the forced regeneration end determining means 32 there is provided an oxygen mass flow rate calculating means (oxygen mass flow rate detecting means) 34 for calculating a mass flow rate of oxygen. In the oxygen mass flow rate calculating means 34, an oxygen mass flow rate $O_{2w}$ is calculated in accordance with the following equation (4):

$$O_{2w} = (Q_{aw} - q \cdot a) \cdot b$$

(4)

In the above equation, $Q_{aw}$ stands for a mass flow rate of intake air obtained from AFS15, q stands for a total fuel injection quantity (main fuel injection quantity+additional fuel injection quantity), a stands for an equivalence ratio (14.7), and b stands for an oxygen mass ratio. A mass flow rate of oxygen entering the filter 8 can be calculated in accordance with the above equation (4).

In the forced regeneration end determining means 32 there also is provided a PM combustion quantity estimating means 36 in addition to the oxygen mass flow rate calculating means 34. In the PM combustion quantity estimating means 36, the integrated value $\Sigma O_{2w}$ of oxygen mass flow rate calculated in the oxygen mass flow rate calculating means 34 is multiplied by the coefficient C to calculate the combustion quantity of PM.

In the forced regeneration end determining means 32, the amount of PM estimated in the PM deposition quantity estimating means 27 at the beginning of forced regeneration is set as a target value, and when the combustion quantity of PM estimated by the PM combustion quantity estimating means 36 reaches the said target value, it is determined that the forced regeneration of the filter 8 is over. That is, when the relation of $C \cdot \Sigma O_{2w} \geq$ target value is satisfied, it is determined that the forced regeneration is over.

When it is determined in the forced regeneration end determining means 32 that the forced regeneration of the filter 8 is over, the first and second additional fuel injection is stopped and the associated controls such as retarding of the main fuel injection timing and throttling of intake air are also stopped, with return to the normal operating condition.

The exhaust gas purifying system embodying the present invention is constructed as above. The operation thereof will be described below in accordance with the flow chart of FIG. 4.

First, in step S1, information from various sensors is inputted. Next, in step S2, it is determined whether Forced Regeneration Flag F is 0 or 1. Forced Regeneration Flag F is used to determine whether a forced regeneration is being executed or not. As will be described later, F is set to 1 when forced regeneration is executed, while F is set to 0 when forced regeneration is not executed. In the initial control cycle, Forced Regeneration Flag F is set to 0, so in this case the processing flow advances to step S3.

In step S3, the deposition quantity of PM is estimated in accordance with information provided from the pressure sensor 12 and the differential pressure sensor 14 and it is determined whether the PM deposition quantity corresponds to a value of not smaller than a predetermined value α or not. If the answer is affirmative, the flow advances to step S4. In step S4, it is determined that the filter 8 is clogged without being regenerated continuously, and the start of forced regeneration is determined. At this time, Forced Regeneration Flag F is set to 1. In step S3 it may be merely determined whether the pressure difference between inlet and outlet pressures in the filter 8, which is detected by the differential pressure sensor 14, has become a value of not smaller than a predetermined value or not, and when the answer is affirmative, the start of forced regeneration may be determined in step S4.

Once the start of forced regeneration is determined in step S4, the flow advances to step S5, in which a heat-up control for the catalyst 6 is executed. In this catalyst heat-up control, as shown in FIG. 3A, an additional fuel (first additional fuel) is injected after the main fuel injection. As this additional fuel burns, the temperature of the catalyst 6 rises.

Next, in step S6, it is determined whether the temperature of the catalyst 6 (actually the catalyst outlet temperature) has reached an activation temperature (about 250° C.) or not, and if the catalyst temperature is lower than the activation temperature, the flow returns. In this case, in the next and subsequent control cycles, the routine of steps S1, S2, S5 and S6 is repeated and only heat-up of the catalyst 6 is executed until the temperature of the catalyst 6 reaches the activation temperature.

If it is determined in step S6 that the catalyst temperature has reached the activation temperature, the flow advances to step S7, in which an additional fuel injection (second additional fuel injection, see FIG. 3B) is executed for the combustion of PM. In this case, first in step S7 it is determined whether the catalyst outlet temperature is not lower than a predetermined temperature (e.g., 600° C.) or not. The predetermined temperature corresponds to a temperature at which the filter 8 is activated and PM burns most efficiently. If the catalyst outlet temperature is lower than the predetermined temperature, the flow advances to step S8, in which the second additional fuel injection quantity q2 is set using the increment map 30a. If the catalyst outlet temperature is not lower than the predetermined temperature, the flow advances to step S9, in which the second additional fuel injection quantity q2 is set using the decrement map 30b. That is, if the catalyst outlet temperature is lower than the predetermined temperature, the second additional fuel injection quantity q2 is set to a rather large value, while if is not lower than the predetermined temperature, the second additional fuel injection quantity q2 is set to a rather small value.

Next, in step S10, an integrated value $\Sigma O_{2w}$ of a mass flow rate of oxygen fed to the filter 8 after arrival of the catalyst outlet temperature at the predetermined temperature is calculated, and an integrated value $C \cdot \Sigma O_{2w}$ of PM which has burnt in the filter 8 is obtained by multiplying the result of the above calculation by a predetermined coefficient C.

Thereafter, the flow advances to step S11, in which it is determined whether the integrated value $C \cdot \Sigma O_{2w}$ of the burnt PM quantity has reached a target value or not. As this target value there is used, for example, the PM deposition quantity α (see step S3) at the beginning of forced regeneration which is calculated on the basis of a differential pressure between inlet and outlet pressures in the filter 8.

As is seen also from the condition for determining the start of forced regeneration (e.g., the PM deposition quantity should be not smaller than a predetermined value, or the inlet-outlet differential pressure in the filter 8 should be not smaller than a predetermined value), the PM deposition quantity at the beginning of forced regeneration assumes an almost constant value, so that the PM deposition quantity at the beginning of forced regeneration may be obtained beforehand by experiment or test and the value thereof (fixed value) may be used as a target value.

If the PM combustion quantity has not reached the target value in step S11, the flow returns and the processing from step S1 to step S11 are repeated. If the PM combustion quantity reached the target value, the flow advances from step S11 to step S12, in which Forced Regeneration Flag F is set to 0 to terminate the forced regeneration.

In step S10 there may be calculated only the integrated value $\Sigma O_{2w}$ of an oxygen mass flow rate. In this case, in step S11, a value (α/C) obtained by dividing the PM deposition quantity a by a predetermined value C is set as a target value and it is determined whether the integrated value $\Sigma O_{2w}$ of an oxygen mass flow rate has reached the said target value or not.

Figure 5A:
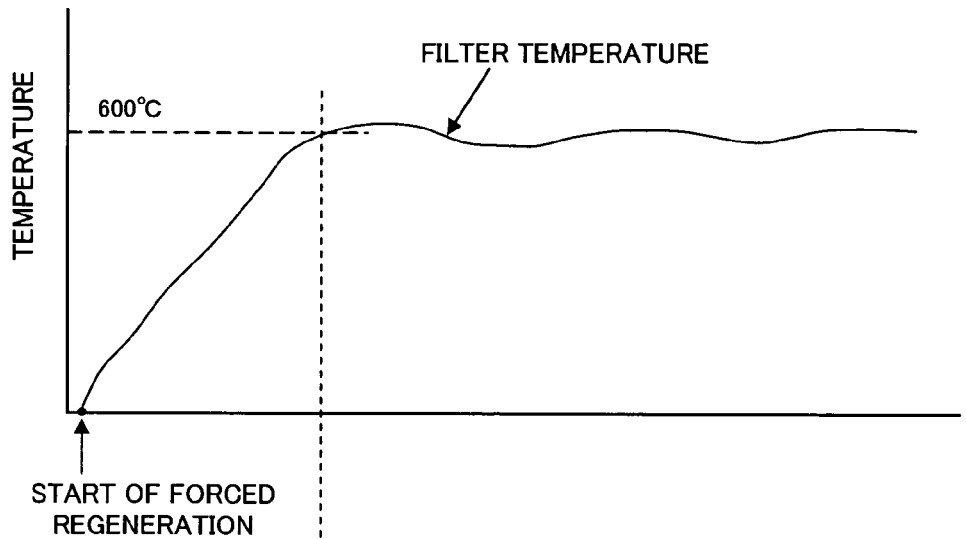
FIGS. 5A and 5B are time charts explaining the operation of the exhaust gas purifying system.
Figure 5B:
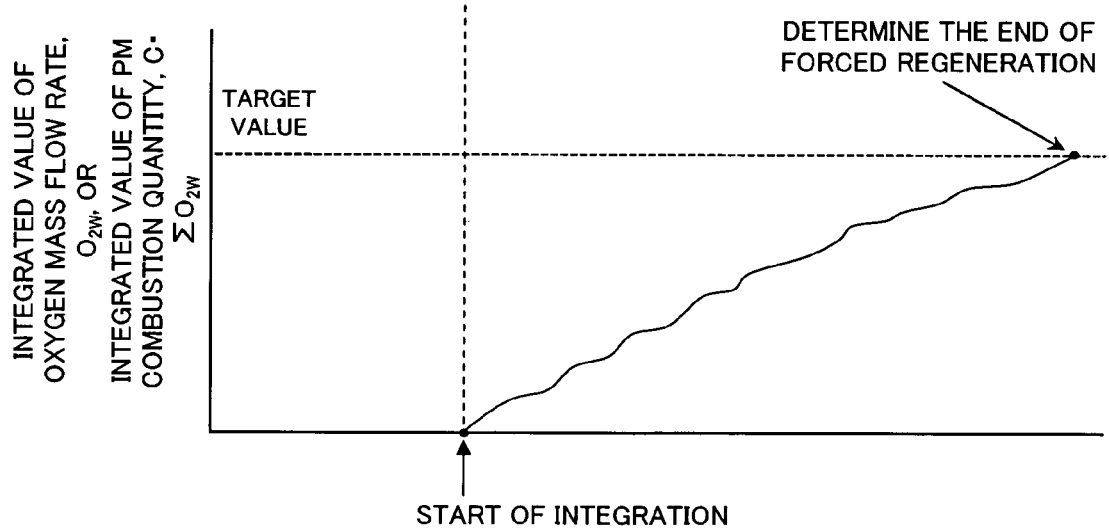

The determination of a forced regeneration end can be shown in terms of a time chart as in FIGS. 5A and 5B. As shown in the same figure, when the filter temperature reaches a predetermined temperature (600° C.) after the start of forced regeneration, the integration of an oxygen mass flow rate is started, and when the integrated value reached a predetermined value (target value), the forced regeneration is over.

By thus determining the end of forced regeneration it is possible to grasp the combustion quantity of PM accurately regardless of a vehicular running condition and hence possible to determine a regeneration end exactly. Generally, during vehicular running, the engine operating condition varies, so the amount of PM which burns in unit time differs during forced regeneration and an end timing of forced regeneration cannot be determined on the basis of a regeneration time. On the other hand, according to the present invention, by integrating the amount of oxygen (more concretely, a mass flow rate of oxygen) fed to the filter 8, which is related closely to the combustion quantity of PM, it is possible to grasp the PM combustion quantity accurately.

In the present invention, as noted above, since the regeneration end of the filter 8 is determined using a mass flow rate of oxygen as parameter, there accrues an advantage that it is not necessary to make correction at a high land where the oxygen concentration is thin and that it is possible to determine a regeneration end without limiting a vehicular running area. According to the present invention, moreover, the determination of a regeneration end can be done accurately with a simple construction without using any complicated logic or any special component, and therefore there arises neither an increase of cost nor an increase of weight.

The present invention is not limited to the above embodiment, but various modifications may be made within the scope not departing from the gist of the invention. For example, although in the above embodiment the oxygen mass flow rate $O_{2w}$ is calculated in accordance with the equation (4), there may be adopted such a construction as shown in FIG. 6, wherein an $O_2$ sensor 50 for detecting the concentration of oxygen and a sensor 52 for detecting the flow rate L of fluid entering the filter 8 are disposed between the catalyst 6 and the filter 8, and the oxygen mass flow rate $O_{2w}$ is determined on the basis of detection results provided from both sensors.

Figure 6:
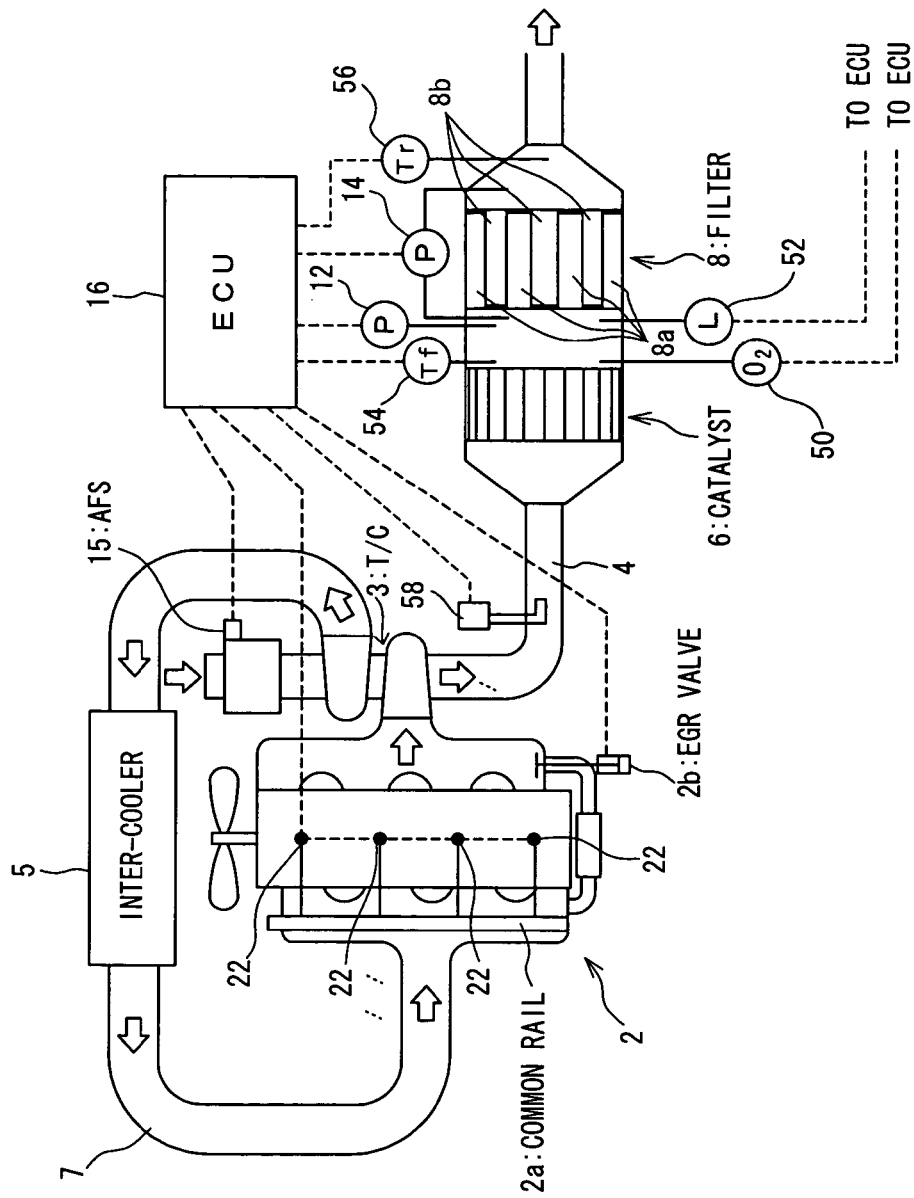
FIG. 6 is a schematic diagram illustrating a modification of the exhaust gas purifying system according to the present invention.

Although in the foregoing embodiment the catalyst outlet temperature is used as the filter temperature, there may be adopted such a construction as shown in FIG. 6, wherein temperature sensors 54 and 56 for detecting an inlet temperature Tf and an outlet temperature Tr, respectively, of the filter 8 are disposed upstream and downstream of the filter 8, and the temperature of the filter 8 is determined from the inlet and outlet temperatures Tf, Tr detected by the sensors 54 and 56 and in accordance with the following equation (5), in which a stands for a value for weighting the inlet and outlet temperatures Tf, Tr, satisfying the relation of $0 \leq a \leq 1$:

Filter temperature $T_{fil} = Tf \cdot a + Tr (1-a)$     (5)

Although in the foregoing embodiment a description has been given of the case where the present invention is applied to the system wherein the supply of fuel (HC) to the filter 8 is effected by performing the second additional fuel injection into the cylinder after the first additional fuel injection, the present invention is also applicable to other systems, for example the system (fuel addition system) illustrated in FIG. 6 which is constructed such that an injector (second injector) 58 for the supply of HC to the filter 8 is disposed in an exhaust passage such as an exhaust port or an exhaust pipe in an engine, and in a forced regeneration, fuel (HC) is added to the exhaust passage directly from the second injector 58 instead of the second additional fuel injection.

Such a fuel addition type system is of the same construction as that foregoing embodiment except that the injector 58 for the addition of fuel is added on hardware. Also as to the contents of control (software), it is substantially the same as that in the foregoing embodiment, with the only difference residing in that the second additional fuel injection in the foregoing embodiment is replaced by fuel addition. In this case, FIGS. 2 to 5 are also applicable by only replacing the second additional fuel injection by fuel addition.

What is claimed is:

1. An exhaust gas purifying system comprising:
   an oxidation catalyst disposed in an exhaust passage of an engine;
   a filter disposed in said exhaust passage at a position downstream of said oxidation catalyst to collect a particulate matter contained in exhaust gas;
   a regeneration start determining means for determining a regeneration start of said filter;
   a regenerator means for regenerating said filter;
   an oxygen mass flow rate detecting means for detecting or calculating a mass flow rate of oxygen fed to said filter; and
   a regeneration end determining means for determining a regeneration end of said filter based on the mass flow rate detected or calculated by said oxygen mass flow rate detecting means,
   wherein said regeneration end determining means determines the regeneration end of said filter when an integrated value of said oxygen mass flow rate reaches a predetermined value during regeneration of said filter by said regenerator means.

2. An exhaust gas purifying system according to claim 1, wherein said regeneration end determining means determines a regeneration end of said filter upon establishment of the following equation:

$\Sigma \Delta PM = C \cdot \Sigma$(oxygen mass flow rate), where $C = A \cdot PM \cdot e^{(-E/RT)}$,
$\Sigma \Delta PM$: target combustion quantity of particulate matter,
$\Sigma$(oxygen mass flow rate): integrated value of a mass flow rate of oxygen fed to the filter,
A: constant obtained by experiment (frequency factor),
PM: amount of particulate matter deposited on the filter at the beginning of regeneration,
E: activation energy constant,
R: gas constant and
T: filter temperature.

3. An exhaust gas purifying system according to claim 1, further comprising an air flow sensor for detecting a flow rate of intake air, and
   wherein said oxygen mass flow rate detecting means calculates the oxygen mass flow rate $O_{2w}$ in accordance with the following equation including the mass flow rate of intake air $Q_{aw}$ obtained from said air flow sensor:

$O_{2w} = (Q_{aw} - q \cdot a) \cdot b$, where q: fuel injection quantity,
a: equivalence ratio, and
b: oxygen mass ratio.

4. An exhaust gas purifying system according to claim 1, further comprising:
   an $O_2$ sensor disposed between said oxidation catalyst and said filter to detect an oxygen concentration; and
   a sensor for detecting the flow rate of fluid entering said filter, and
   wherein the oxygen mass flow rate detecting means calculates the oxygen mass flow rate $O_{2w}$ on the basis of detection results provided from said two sensors.

5. An exhaust gas purifying system according to claim 1, wherein said regeneration end determining means determines the end of regeneration only during forced regeneration of said filter.

6. An exhaust gas purifying system according to claim 1, wherein said engine is a diesel engine.

7. An exhaust gas purifying system according to claim 1, further comprising a temperature detecting means for detecting the temperature of said filter, and
   wherein said regeneration end determining means determines a regeneration end of said filter in accordance with information provided from said temperature detecting means and said oxygen mass flow rate detecting means and upon arrival at a predetermined value of an integrated value of said oxygen mass flow rate from the time when the temperature of said filter has reached a predetermined temperature.

8. An exhaust gas purifying system according to claim 7, wherein said temperature detecting means is a temperature sensor disposed downstream of said catalyst, and an outlet temperature of said catalyst is used as the temperature of said filter.

9. An exhaust gas purifying system according to claim 7, wherein:
   said temperature detecting means comprises temperature sensors disposed upstream and downstream respectively of said filter to detect an inlet temperature Tf and an outlet temperature Tr of the filter, and
   said temperature detecting means calculates a filter temperature on the basis of the inlet temperature Tf and the outlet temperature Tr detected by said temperature sensors and in accordance with the following equation:

Filter temperature $T_{fil} = Tf \cdot a + Tr(1-a)$, where a: a value for weighting the inlet temperature Tf and the outlet temperature Tr, satisfying the relation of $0 \leq a \leq 1$.

10. An exhaust gas purifying system according to claim 1, wherein:
    said regeneration end determining means has a combustion quantity estimating means for calculating or estimating a combustion quantity of the particulate matter collected by said filter,
    said combustion quantity estimating means calculating or estimating a combustion quantity of the particulate matter by multiplying the integrated value of the oxygen mass flow rate obtained from said oxygen mass flow rate detecting means by a predetermined coefficient, and the end of regeneration of said filter is determined upon arrival at a predetermined target value of the combustion quantity of the particulate matter calculated or estimated by said combustion quantity estimating means.

11. An exhaust gas purifying system according to claim 10, wherein:

said regeneration start determining means has a deposition quantity estimating means for calculating or estimating a deposition quantity of the particulate matter deposited on said filter, and said predetermined target value is a deposition quantity of the particulate matter at the beginning of the regeneration which is estimated by said deposition quantity estimating means.

12. A regeneration end determining method for an exhaust gas purifying system comprising an oxidation catalyst disposed in an exhaust passage of an engine and a filter disposed in the exhaust passage at a position downstream of said oxidation catalyst to collect a particulate matter contained in exhaust gas, said method comprising the steps of:

starting a forced regeneration of said filter;

determining whether the temperature of said filter has reached a predetermined temperature or not during execution of said forced regeneration;

determining whether an integrated value of an oxygen mass flow rate, from the time point of the filter temperature reaching the predetermined temperature during execution of said forced regeneration, has reached a predetermined value or not; and terminating said forced regeneration when the integrated value of said oxygen mass flow rate reaches the predetermined value.

13. A regeneration end determining method for an exhaust gas purifying system comprising an oxidation catalyst disposed in an exhaust passage of an engine and a filter disposed in the exhaust passage at a position downstream of said oxidation catalyst to collect a particulate matter contained in exhaust gas, said method comprising the steps of:

determining whether a forced regeneration of said filter is being executed or not;

determining whether the temperature of said filter has reached a predetermined temperature or not during execution of said forced regeneration;

determining whether an integrated value of an oxygen mass flow rate, from the time-point of the filter temperature reaching the predetermined temperature during execution of said forced regeneration, has reached a predetermined value or not; and terminating said forced regeneration when the integrated value of said oxygen mass flow rate reaches the predetermined value.

* * * * *

UNITED STATES PATENT AND TRADEMARK OFFICE
CERTIFICATE OF CORRECTION

PATENT NO.        : 7,104,049 B2
APPLICATION NO. : 10/808209
DATED             : September 12, 2006
INVENTOR(S)       : Satoshi Hiranuma et al.

It is certified that error appears in the above-identified patent and that said Letters Patent is hereby corrected as shown below:

Item (73), indicating the Assignee, should be inserted and indicate the following Assignee:

--MITSUBISHI FUSO TRUCK AND BUS CORPORATION
16-4, Konan 2-chome, Minato-ku
Tokyo 108-8285, Japan--

Item [75], listing the inventors and their mailing addresses, should be deleted and replaced with the following:

Item --(75) Inventors: Satoshi Hiranuma, Tokyo (JP); Yoshinaka Takeda, Tokyo (JP); Toru Kawatani, Tokyo (JP); Reiko Doumeki, Tokyo (JP)--

Signed and Sealed this

Twelfth Day of June, 2007

JON W. DUDAS
*Director of the United States Patent and Trademark Office*